(12) United States Patent
Wang et al.

(10) Patent No.: US 12,699,879 B2
(45) Date of Patent: Aug. 4, 2026

(54) DEFENSE AGAINST ADVERSARIAL EXAMPLE INPUT TO MACHINE LEARNING MODELS

(71) Applicant: Dell Products L.P., Round Rock, TX (US)

(72) Inventors: Zijia Wang, WeiFang (CN); Jiacheng Ni, Shanghai (CN); Jinpeng Liu, Shanghai (CN); Zhen Jia, Shanghai (CN); Kenneth Durazzo, Morgan Hill, CA (US)

(73) Assignee: Dell Products L.P., Round Rock, TX (US)

( * ) Notice: Subject to any disclaimer, the term of this patent is extended or adjusted under 35 U.S.C. 154(b) by 794 days.

(21) Appl. No.: 17/954,539

(22) Filed: Sep. 28, 2022

(65) Prior Publication Data

US 2024/0119260 A1      Apr. 11, 2024

(51) Int. Cl.
*G06N 3/045*          (2023.01)
*G06N 3/088*          (2023.01)

(52) U.S. Cl.
CPC ............. *G06N 3/045* (2023.01); *G06N 3/088* (2013.01)

(58) Field of Classification Search
CPC ............................... G06N 3/045; G06N 3/088
USPC .......................................................... 706/15
See application file for complete search history.

(56) References Cited

U.S. PATENT DOCUMENTS

| | | | | |
|---|---|---|---|---|
| 2019/0139445 A1* | 5/2019 | Reddy | ............... | G09B 19/0092 |
| 2019/0205794 A1* | 7/2019 | Hsu | ....................... | G06N 20/20 |
| 2020/0401111 A1* | 12/2020 | Zubarev | ................ | G06N 20/00 |
| 2021/0110210 A1* | 4/2021 | Tsai | ....................... | G06N 3/084 |
| 2021/0265018 A1* | 8/2021 | Dutta | ...................... | G06N 5/04 |
| 2022/0180204 A1* | 6/2022 | Katsuki | ................. | G06N 3/088 |

(Continued)

OTHER PUBLICATIONS

Mirzaeian et al, "Diverse Knowledge Distillation (DKD): A Solution for Improving The Robustness of Ensemble Models Against Adversarial Attacks" (Year: 2020).*

(Continued)

*Primary Examiner* — Abdullah Al Kawsar
*Assistant Examiner* — Jun Kwon
(74) *Attorney, Agent, or Firm* — Ryan, Mason & Lewis, LLP

(57)                ABSTRACT

An apparatus comprises a processing device configured to train first and second machine learning models utilizing a first training dataset comprising inputs each associated with a class label of one of a set of classes and a second training dataset comprising distilled representations of the two or more classes, and to identify candidate adversarial example inputs utilizing the trained first and second machine learning models. The processing device is further configured to determine whether the candidate adversarial example inputs are true positive adversarial example inputs based on a confidence-aware clustering and to generate an updated first training dataset comprising corrected class labels for the true positive adversarial example inputs and an updated second training dataset comprising updated distilled representations determined utilizing the corrected class labels. The processing device is further configured to re-train the first and second machine learning models utilizing the updated first and second training datasets.

20 Claims, 13 Drawing Sheets

(56) References Cited

U.S. PATENT DOCUMENTS

2022/0237373 A1* 7/2022 Singh Bawa .......... G06N 20/00

OTHER PUBLICATIONS

Papernot et al, "Distillation as a Defense to Adversarial Perturbations against Deep Neural Networks", 2016 (Year: 2016).*

Y. Li et al., "A Review of Adversarial Attack and Defense for Classification Methods," The American Statistician, Jan. 4, 2022, 17 pages.

D. Kalaria et al., "Detecting Adversaries, yet Faltering to Noise? Leveraging Conditional Variational AutoEncoders for Adversary Detection in the Presence of Noisy Images," arXiv:2111.15518v2, Dec. 9, 2021, 12 pages.

U. Hwang et al., "PuVAE: A Variational Autoencoder to Purify Adversarial Examples," arXiv:1903.00585v1, Mar. 2, 2019, 7 pages.

N. Papernot et al., "Deep k-Nearest Neighbors: Towards Confident, Interpretable and Robust Deep Learning," arXiv:1803.04765v1, Mar. 13, 2018, 18 pages.

N. Dilokthanakul et al., "Deep Unsupervised Clustering with Gaussian Mixture Variational Autoencoders," arXiv:1611.02648v2, Jan. 13, 2017, 12 pages.

J. Raghuram et al., "A General Framework For Detecting Anomalous Inputs to DNN Classifiers," arXiv:2007.15147v3, Jun. 17, 2021, 27 pages.

N. Papernot et al, "Distillation as a Defense to Adversarial Perturbations against Deep Neural Networks," IEEE Symposium on Security & Privacy, arXiv:1511.04508v2, Mar. 14, 2016, 16 pages.

N. Carlini et al., "Defensive Distillation is Not Robust to Adversarial Examples," arXiv:1607.04311v1, Jul. 14, 2016, 3 pages.

T. Wang et al., "Dataset Distillation," arXiv:1811.10959v3, Feb. 24, 2020, 14 pages.

* cited by examiner

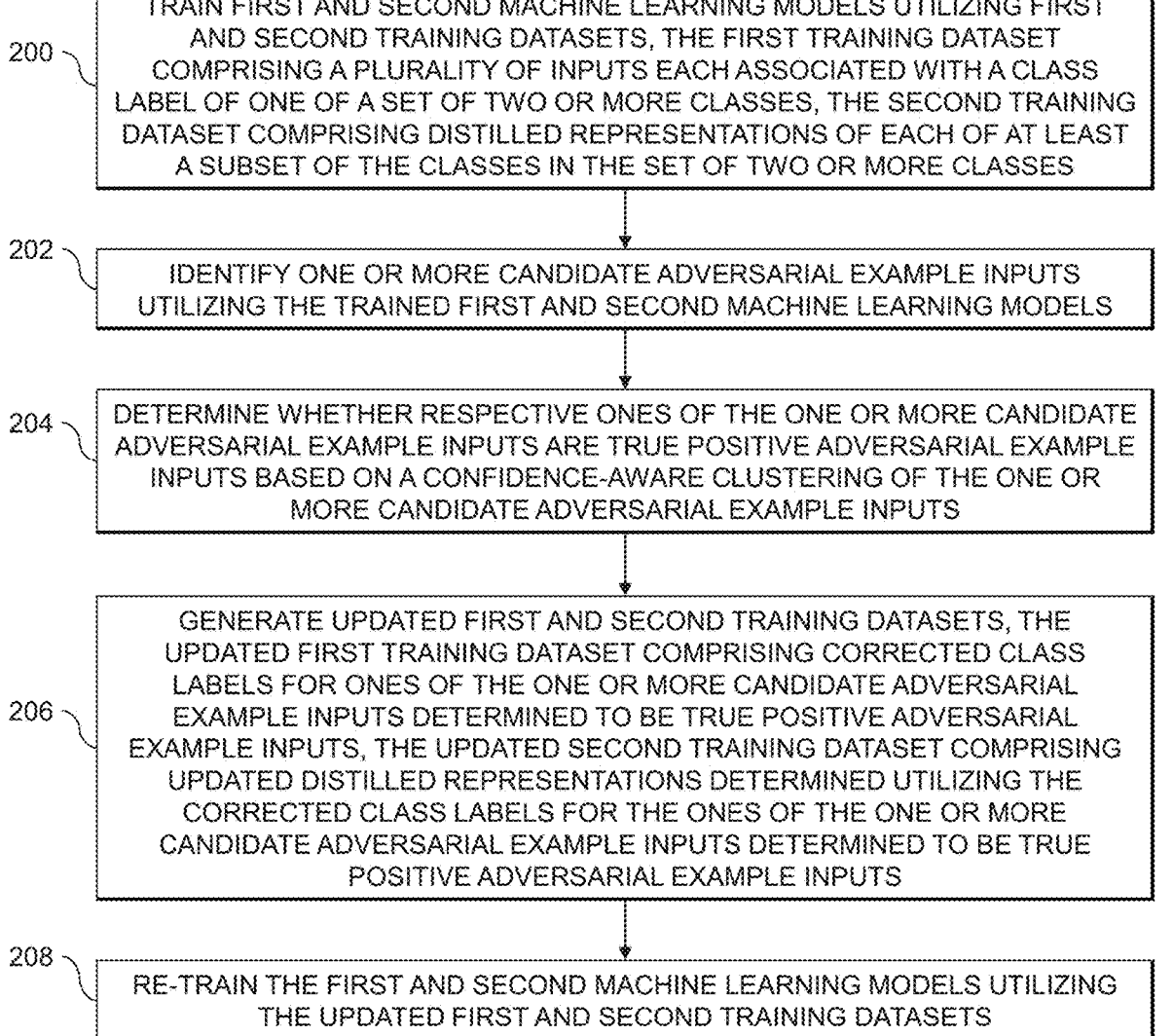

200 — TRAIN FIRST AND SECOND MACHINE LEARNING MODELS UTILIZING FIRST AND SECOND TRAINING DATASETS, THE FIRST TRAINING DATASET COMPRISING A PLURALITY OF INPUTS EACH ASSOCIATED WITH A CLASS LABEL OF ONE OF A SET OF TWO OR MORE CLASSES, THE SECOND TRAINING DATASET COMPRISING DISTILLED REPRESENTATIONS OF EACH OF AT LEAST A SUBSET OF THE CLASSES IN THE SET OF TWO OR MORE CLASSES

202 — IDENTIFY ONE OR MORE CANDIDATE ADVERSARIAL EXAMPLE INPUTS UTILIZING THE TRAINED FIRST AND SECOND MACHINE LEARNING MODELS

204 — DETERMINE WHETHER RESPECTIVE ONES OF THE ONE OR MORE CANDIDATE ADVERSARIAL EXAMPLE INPUTS ARE TRUE POSITIVE ADVERSARIAL EXAMPLE INPUTS BASED ON A CONFIDENCE-AWARE CLUSTERING OF THE ONE OR MORE CANDIDATE ADVERSARIAL EXAMPLE INPUTS

206 — GENERATE UPDATED FIRST AND SECOND TRAINING DATASETS, THE UPDATED FIRST TRAINING DATASET COMPRISING CORRECTED CLASS LABELS FOR ONES OF THE ONE OR MORE CANDIDATE ADVERSARIAL EXAMPLE INPUTS DETERMINED TO BE TRUE POSITIVE ADVERSARIAL EXAMPLE INPUTS, THE UPDATED SECOND TRAINING DATASET COMPRISING UPDATED DISTILLED REPRESENTATIONS DETERMINED UTILIZING THE CORRECTED CLASS LABELS FOR THE ONES OF THE ONE OR MORE CANDIDATE ADVERSARIAL EXAMPLE INPUTS DETERMINED TO BE TRUE POSITIVE ADVERSARIAL EXAMPLE INPUTS

208 — RE-TRAIN THE FIRST AND SECOND MACHINE LEARNING MODELS UTILIZING THE UPDATED FIRST AND SECOND TRAINING DATASETS

DEFENSE AGAINST ADVERSARIAL EXAMPLE INPUT TO MACHINE LEARNING MODELS

FIELD

The field relates generally to information processing, and more particularly to management of information processing systems.

BACKGROUND

Machine learning models are subject to various attacks, including so-called adversarial example attacks. Adversarial example attacks seek to modify an input to a machine learning model, such that the machine learning model will misclassify the input. An adversarial example attack, for example, may apply some set of perturbations to an image input to produce an adversarial example that appears to the human eye as the original image, but which tricks the machine learning model into classifying the image as something else. Adversarial examples are purposefully crafted inputs that cause the machine learning model to make mistakes.

SUMMARY

Illustrative embodiments of the present disclosure provide techniques for defense against adversarial example input to machine learning models.

In one embodiment, an apparatus comprises at least one processing device comprising a processor coupled to a memory. The at least one processing device is configured to perform the steps of training first and second machine learning models utilizing first and second training datasets, the first training dataset comprising a plurality of inputs each associated with a class label of one of a set of two or more classes, the second training dataset comprising distilled representations of each of at least a subset of the classes in the set of two or more classes, and identifying one or more candidate adversarial example inputs utilizing the trained first and second machine learning models. The at least one processing device is further configured to perform steps of determining whether respective ones of the one or more candidate adversarial example inputs are true positive adversarial example inputs based on a confidence-aware clustering of the one or more candidate adversarial example inputs and generating updated first and second training datasets, the updated first training dataset comprising corrected class labels for ones of the one or more candidate adversarial example inputs determined to be true positive adversarial example inputs, the updated second training dataset comprising updated distilled representations determined utilizing the corrected class labels for the ones of the one or more candidate adversarial example inputs determined to be true positive adversarial example inputs. The at least one processing device is further configured to perform the step of re-training the first and second machine learning models utilizing the updated first and second training datasets.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for defense against adversarial example input to machine learning models in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
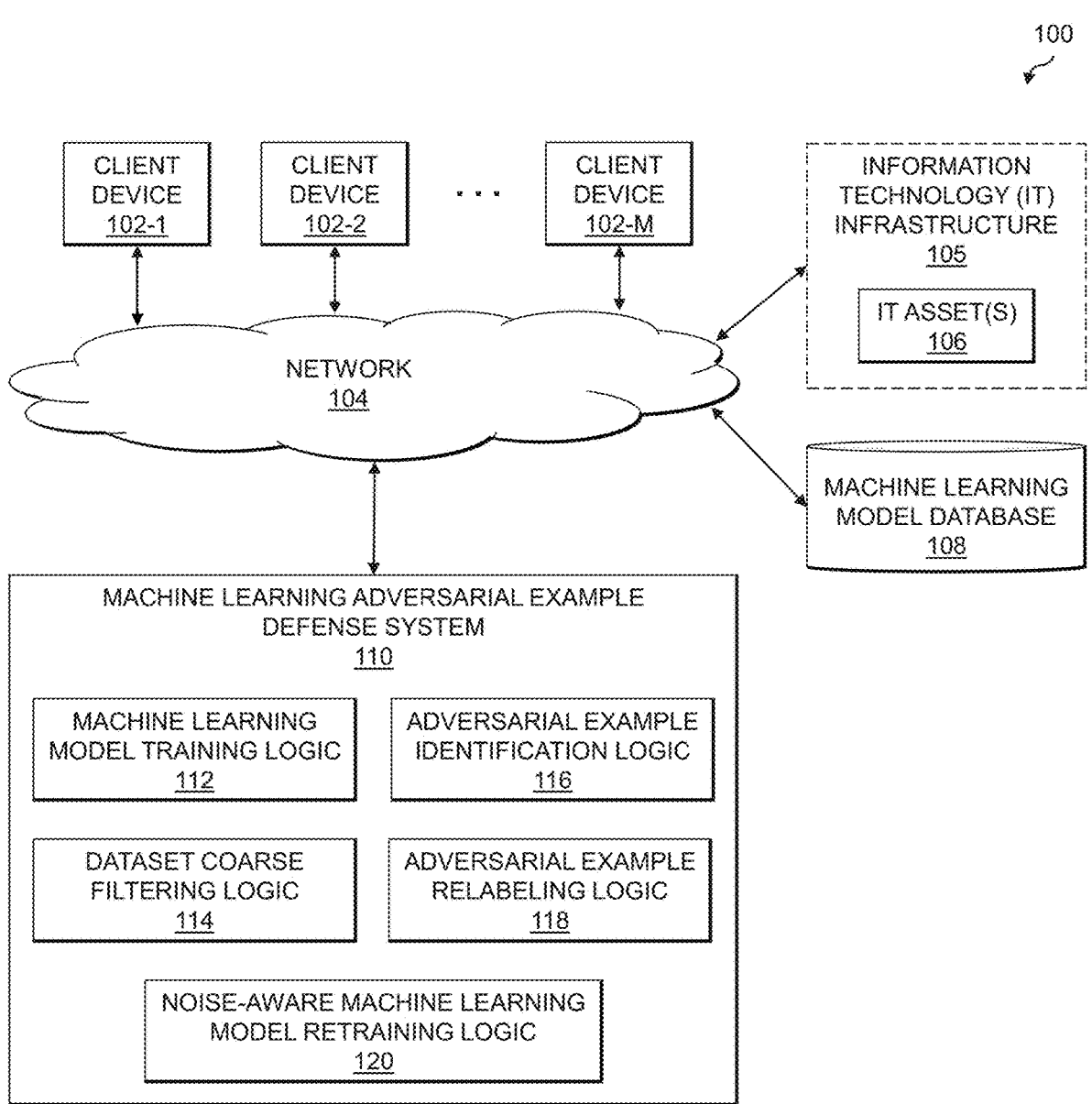
FIG. 1 is a block diagram of an information processing system configured for defense against adversarial example input to machine learning models in an illustrative embodiment.

FIG. 1 shows an information processing system 100 configured in accordance with an illustrative embodiment. The information processing system 100 is assumed to be built on at least one processing platform and provides functionality for defense against adversarial example input to machine learning models. Adversarial examples refer to input that an attacker has designed in order to trick the machine learning algorithms (e.g., which causes the machine learning algorithms to make a mistake, such as misclassifying the input). The information processing system 100 includes a set of client devices 102-1, 102-2, . . . 102-M (collectively, client devices 102) which are coupled to a network 104. Also coupled to the network 104 is an information technology (IT) infrastructure 105 comprising one or more IT assets 106, a machine learning model database 108, and a machine learning adversarial example defense system 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The IT assets 106 of the IT infrastructure 105 may host applications that are utilized by respective ones of the client devices 102, such as in accordance with a client-server computer program architecture. In some embodiments, the applications comprise web applications designed for delivery from assets in the IT infrastructure 105 to users (e.g., of client devices 102) over the network 104. Various other examples are possible, such as where one or more applications are used internal to the IT infrastructure 105 and not exposed to the client devices 102. It is assumed that the client devices 102 and/or IT assets 106 of the IT infrastructure 105 utilize one or more machine learning algorithms as part of such applications. As described in further detail below, the machine learning adversarial example defense system 110 can advantageously be used to detect whether inputs to such machine learning algorithms represent adversarial examples.

In some embodiments, the machine learning adversarial example defense system 110 is used for an enterprise system. For example, an enterprise may subscribe to or otherwise utilize the machine learning adversarial example defense system 110 for defending against adversarial example input to machine learning applications (e.g., running on client devices 102 operated by users of the enterprise, running on the IT assets 106 of the IT infrastructure 105, etc.). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The machine learning model database 108, as discussed above, is configured to store and record various information that is used by the machine learning adversarial example defense system 110 for defending against adversarial example input to one or more machine learning applications (e.g., running on the client devices 102, the IT assets 106 of the IT infrastructure 105, etc.). Such information may include, but is not limited to, information regarding configuration of machine learning models, training data for the machine learning models, etc. In some embodiments, one or more of the storage systems utilized to implement the machine learning model database 108 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the machine learning adversarial example defense system 110, as well as to support communication between the machine learning adversarial example defense system 110 and other related systems and devices not explicitly shown.

The client devices 102 are configured to access or otherwise utilize the IT infrastructure 105. In some embodiments, the client devices 102 are assumed to be associated with system administrators, IT managers or other authorized personnel responsible for managing the IT assets 106 of the IT infrastructure 105 (e.g., where such management includes determining whether input to machine learning applications running on the IT assets 106 include adversarial examples). For example, a given one of the client devices 102 may be operated by a user to access a graphical user interface (GUI) provided by the machine learning adversarial example defense system 110 to manage machine learning applications that run on the IT assets 106 of the IT infrastructure 105. The machine learning adversarial example defense system 110 may be provided as a cloud service that is accessible by the given client device 102 to allow the user thereof to manage machine learning applications running on one or more of the IT assets 106 of the IT infrastructure 105. In some embodiments, the IT assets 106 of the IT infrastructure 105 are owned or operated by the same enterprise that operates the machine learning adversarial example defense system 110 (e.g., where an enterprise such as a business provides support for the assets it operates). In other embodiments, the IT assets 106 of the IT infrastructure 105 may be owned or operated by one or more enterprises different than the enterprise which operates the machine learning adversarial example defense system 110 (e.g., a first enterprise provides support for assets that are owned by multiple different customers, business, etc.). Various other examples are possible.

In some embodiments, the client devices 102 and/or the IT assets 106 of the IT infrastructure 105 may implement host agents that are configured for automated transmission of information regarding machine learning applications (e.g., which run on the client devices 102 and/or the IT assets 106 of the IT infrastructure 105). Such host agents may also or alternatively be configured to automatically receive from the machine learning adversarial example defense system 110 commands or instructions to perform various remedial actions in response to detecting that particular input to one or more of the machine learning applications represent adversarial examples, such as checking and relabeling the adversarial examples.

It should be noted that a "host agent" as this term is generally used herein may comprise an automated entity, such as a software entity running on a processing device. Accordingly, a host agent need not be a human entity.

The machine learning adversarial example defense system 110 in the FIG. 1 embodiment is assumed to be implemented using at least one processing device. Each such processing device generally comprises at least one processor and an associated memory, and implements one or more functional modules or logic for controlling certain features of the machine learning adversarial example defense system 110. In the FIG. 1 embodiment, the machine learning adversarial example defense system 110 is configured to implement machine learning model training logic 112, dataset coarse filtering logic 114, adversarial example identification logic 116, adversarial example relabeling logic 118 and noise-aware machine learning model retraining logic 120. The machine learning model training logic 112 is configured to train first and second machine learning models using a first dataset and a second dataset, respectively, where the second dataset is a distillation of the first dataset. The dataset coarse filtering logic 114 is configured to provide input to the trained first and second machine learning models and to use the output of the trained first and second machine learning models to identify suspected or candidate adversarial example inputs. The adversarial example identification logic 116 is configured to identify whether the suspected or candidate adversarial example inputs are true positives. To do so, the adversarial example identification logic 116 may generate soft labels for the suspected or candidate adversarial example inputs and cluster the suspected or candidate adversarial example inputs utilizing the generated soft labels. Ones of the suspected or candidate adversarial example inputs not belonging to any of the clusters (e.g., having some threshold distance from any of the clusters) are identified as true positive adversarial example inputs. The adversarial example relabeling logic 118 is configured to re-label the true positive adversarial example inputs with correct labels to generate an additional training dataset. The additional training dataset is utilized by the noise-aware machine learning model retraining logic 120 to retrain the first and second machine learning models, which includes updating the distilled dataset.

It is to be appreciated that the particular arrangement of the client devices 102, the IT infrastructure 105 and the machine learning adversarial example defense system 110 illustrated in the FIG. 1 embodiment is presented by way of example only, and alternative arrangements can be used in other embodiments. As discussed above, for example, the machine learning adversarial example defense system 110 (or portions of components thereof, such as one or more of the machine learning model training logic 112, the dataset coarse filtering logic 114, the adversarial example identification logic 116, the adversarial example relabeling logic 118 and the noise-aware machine learning model retraining logic 120) may in some embodiments be implemented internal to one or more of the client devices 102 and/or the IT infrastructure 105.

At least portions of the machine learning model training logic 112, the dataset coarse filtering logic 114, the adversarial example identification logic 116, the adversarial example relabeling logic 118 and the noise-aware machine learning model retraining logic 120 may be implemented at least in part in the form of software that is stored in memory and executed by a processor.

The machine learning adversarial example defense system 110 and other portions of the information processing system 100, as will be described in further detail below, may be part of cloud infrastructure.

The machine learning adversarial example defense system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the machine learning model database 108 and the machine learning adversarial example defense system 110 or components thereof (e.g., the machine learning model training logic 112, the dataset coarse filtering logic 114, the adversarial example identification logic 116, the adversarial example relabeling logic 118 and the noise-aware machine learning model retraining logic 120) may be implemented on respective distinct processing platforms, although numerous other arrangements are possible. For example, in some embodiments at least portions of the machine learning adversarial example defense system 110 and one or more of the client devices 102, the IT infrastructure 105 and/or the machine learning model database 108 are implemented on the same processing platform. A given client device (e.g., 102-1) can therefore be implemented at least in part within at least one processing platform that implements at least a portion of the machine learning adversarial example defense system 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the machine learning model database 108 and the machine learning adversarial example defense system 110, or portions or components thereof, to reside in different data centers. Numerous other distributed implementations are possible. The machine learning adversarial example defense system 110 can also be implemented in a distributed manner across multiple data centers.

Additional examples of processing platforms utilized to implement the machine learning adversarial example defense system 110 and other components of the information processing system 100 in illustrative embodiments will be described in more detail below in conjunction with FIGS. 10 and 11.

It is to be appreciated that these and other features of illustrative embodiments are presented by way of example only, and should not be construed as limiting in any way.

It is to be understood that the particular set of elements shown in FIG. 1 for defense against adversarial example input to machine learning models is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for defense against adversarial example input to machine learning models will now be described in more detail with reference to the flow diagram of FIG. 2. It is to be understood that this particular process is only an example, and that additional or alternative processes for defense against adversarial example input to machine learning models may be used in other embodiments.

In this embodiment, the process includes steps 200 through 208. These steps are assumed to be performed by the machine learning adversarial example defense system 110 utilizing the machine learning model training logic 112, the dataset coarse filtering logic 114, the adversarial example identification logic 116, the adversarial example relabeling logic 118 and the noise-aware machine learning model retraining logic 120. The process begins with step 200, training first and second machine learning models utilizing first and second training datasets. The first training dataset comprises a plurality of inputs each associated with a class label of one of a set of two or more classes. The second training dataset comprises distilled representations of each of at least a subset of the classes in the set of two or more classes. The class labels in the first training dataset may comprise hard label information, and the distilled representations in the second training dataset may comprise soft label information. The distilled representations in the second training dataset may comprise prototypes of feature information for each of at least a subset of the classes in the set of two or more classes. The first machine learning model may comprise a capsule neural network, and the distilled representations in the second training dataset may be derived from patterns in the first training dataset learned by the trained capsule neural network. The first and second machine learning models may utilize a same neural network architecture. The neural network architecture of the first and second machine learning models may comprise one or more hidden layers and a softmax output layer.

In step 202, one or more candidate adversarial example inputs are identified utilizing the trained first and second machine learning models. Step 202 may comprise, for a given one of the one or more candidate adversarial example inputs, determining whether a first output classification for the given candidate adversarial example input generated utilizing the trained first machine learning model is different than a second output classification for the given candidate adversarial example input generated utilizing the trained second machine learning model.

In step 204, a determination is made as to whether respective ones of the one or more candidate adversarial example inputs are true positive adversarial example inputs based on a confidence-aware clustering of the one or more candidate adversarial example inputs. The confidence-aware clustering of the one or more candidate adversarial example inputs may be based at least in part on confidence scores for the one or more candidate adversarial example inputs, a given confidence score for a given one of the one or more candidate adversarial example inputs being determined based at least in part on a similarity metric characterizing similarity of first and second output classifications for the given candidate adversarial example input generated by the trained first and second machine learning models. The similarity metric may comprise a cosine similarity metric. The confidence-aware clustering may utilize a K-means clustering algorithm. The confidence-aware clustering may comprise, for a given one of the one or more candidate adversarial example inputs, determining probabilities that the given candidate adversarial example input belongs to each class in the set of two or more classes.

Updated first and second training datasets are generated in step 206. The updated first training dataset comprises corrected class labels for ones of the one or more candidate adversarial example inputs determined to be true positive adversarial example inputs. The updated second training dataset comprises updated distilled representations determined utilizing the corrected class labels for the ones of the one or more candidate adversarial example inputs determined to be true positive adversarial example inputs. The first and second machine learning models are re-trained in step 208 utilizing the updated first and second training datasets. Re-training the first and second machine learning models may be based at least in part on confidence scores for the ones of the one or more candidate adversarial example inputs determined to be true positive adversarial example inputs. The re-training of the first and second machine learning models may have a loss determined based at least in part on ratios of the confidence scores for the ones of the one or more candidate adversarial example inputs determined to be true positive adversarial example inputs and an original classification loss during the training of the first and second machine learning models. The re-trained first and second machine learning models may be used for performing classification of subsequent input.

Figure 3:
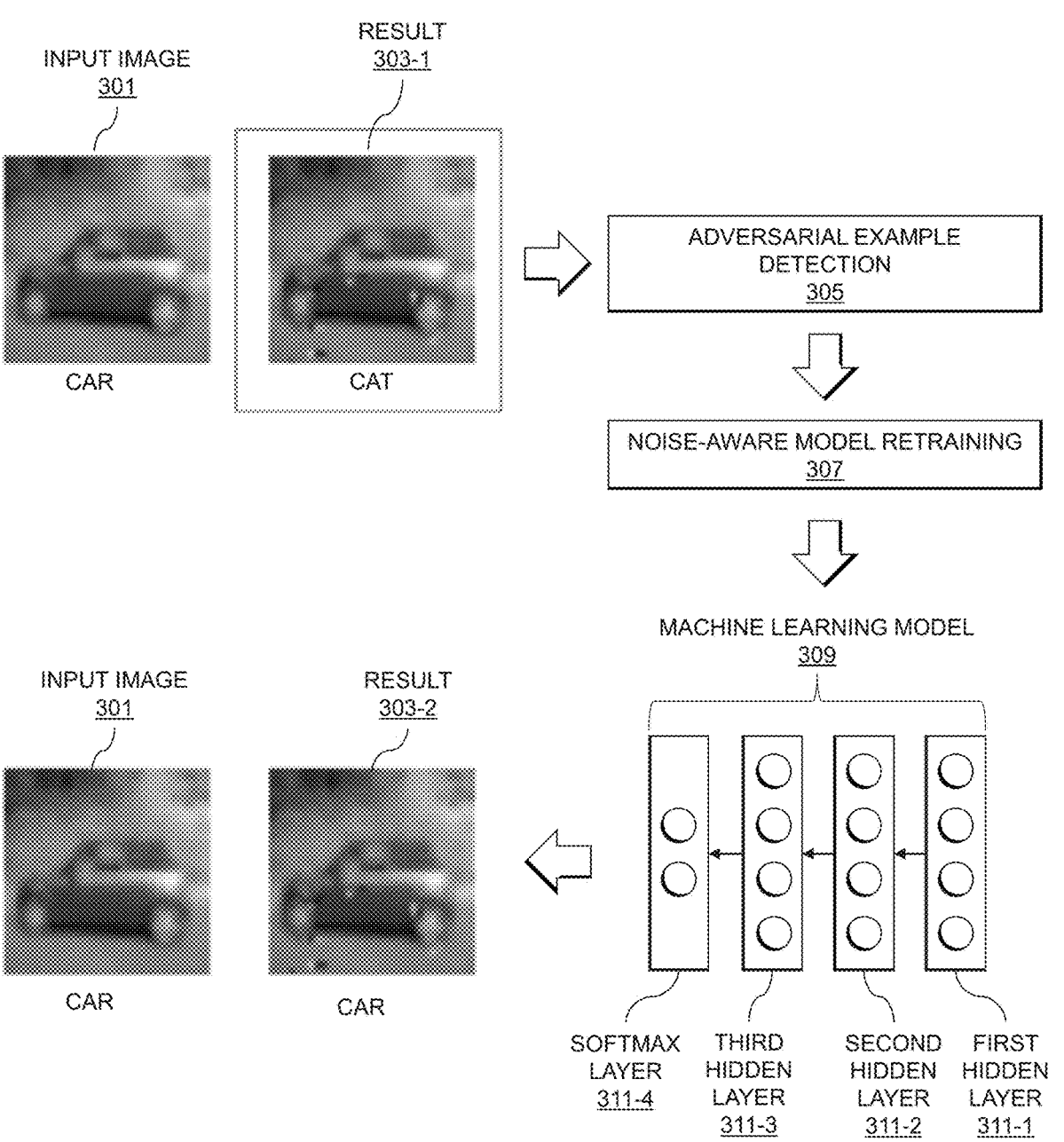
FIG. 3 shows a system flow for noise-aware retraining of a machine learning model for defense against adversarial example input in an illustrative embodiment.

Illustrative embodiments provide approaches for using soft label-based dataset distillation for defense against adversarial example input to machine learning models. Artificial intelligence (AI) is used in a wide variety of application areas, such as in automotive computer vision (e.g., autonomous driving), network traffic pattern analysis, image recognition, etc. In these and other AI application areas, enormous amounts of data and computation power are needed. Thus, managing the data, machine learning models, and the underlying IT infrastructure is complex and expensive. Deep learning, like other machine learning techniques, is vulnerable to adversarial examples (e.g., input that is crafted to force a deep neural network (DNN) or other machine learning model to provide adversary-selected outputs). FIG. 3 shows an example of an adversarial example attack, whereby an input image 301 (which appears to the human eye as a car) leads to a classification result 303-1 of a cat.

Adversarial examples are thus very dangerous to deep learning or machine learning applications. Consider, as an example, an adversarial attack in automotive computer vision or self-driving applications. Specifically designed sets of perturbations may be applied to road signs or other road indicators which lead to misclassifications that are dangerous to pedestrians, to the vehicle itself, etc. For example, a set of perturbations may be applied to an image of a traffic "stop" sign which results in a machine learning model misclassifying the traffic "stop" sign as a "speed limit" sign. There are other types of adversarial example attacks that can be exerted from the physical world. For example, three-dimensional (3D) printing of glasses with perturbations, or directly printing perturbations on the frames of glasses, may result in a machine learning face recognition system misclassifying a person wearing such glasses (e.g., misclassifying an unauthorized individual as an authorized individual).

Illustrative embodiments provide technical solutions for defending against adversarial examples which utilize dataset distillation. Dataset distillation tries to distill the knowledge from a large training dataset into a small one, with the newly generated distilled dataset containing more generalized information because of the soft labels and the distillation process. Therefore, the technical solutions in some embodiments do not rely on transferring knowledge between different neural network or other machine learning architectures. Instead, the technical solutions in some embodiments utilize knowledge extracted from a DNN or other machine learning model to improve its own resilience to adversarial examples. As shown in FIG. 3, the technical solutions in some embodiments provide a dataset distillation adversarial defense (DDAD) algorithm configured to explore analytically and empirically the use of dataset distillation as a defense mechanism against adversarial examples. The knowledge extracted during distillation is used to reduce the amplitude of network gradients exploited by an attacker to craft adversarial examples. The input image 301 and its classification result 303-1 are processed in block 305 to detect adversarial examples. The adversarial example detection algorithm used in block 305 may include automated detection of adversarial examples, followed by manual (e.g., human) checking and relabeling. In block 307, noise-aware model retraining is used to intelligently update machine learning model 309. The machine learning model 309 in FIG. 3 includes a neural network architecture with hidden layers 311-1, 311-2 and 311-3, as well as a softmax output layer 311-4. It should be appreciated, however, that various other types of machine learning models may be used with different architectures. Following the noise-aware model retraining in block 307, the re-trained machine learning model 309 correctly outputs a classification result 303-2 (e.g., "car") for the input image 301.

The technical solutions described herein provide a training process for adversarial example detection which is based on dataset distillation. In some embodiments, two machine learning models are trained using an original dataset and a distilled dataset, with the two machine learning models helping one another to coarsely identify adversarial examples. The technical solutions described herein also provide an unsupervised adversarial example identification algorithm. The unsupervised adversarial example identification algorithm may be viewed as a fine-tuning of the coarse filtering provided using the two machine learning models that utilize the original and distilled datasets. Based on the distilled dataset and weighted clustering, abnormal samples (e.g., potential adversarial examples) are detected. Such abnormal samples may then be further analyzed to verify whether they are adversarial examples (e.g., via manual processing by human agents). A noise-aware retraining process is then applied to retrain the two machine learning models.

A key idea of dataset distillation is to synthesize some data samples which can work as "teachers" to train new models. Conventional dataset distillation algorithms, however, have various restrictions and limitations which make them hard to generalize. Further, conventional dataset distillation algorithms have very strict retraining processes, and require significant prior knowledge to set new untrained models. Dataset distillation algorithms may be extended to complete tasks like text classification, but they are not explainable and robust due to less reliable labels. The technical solutions described herein advantageously provide a generalized and explainable dataset distillation algorithm, to make dataset distillation more powerful.

A capsule neural network (CapsNN) is a neural network architecture which extends a convolutional neural network (CNN) by reusing end results. CapsNN provides a good system in machine learning for various applications. The intuition behind CapsNN is clear, and shows that the entropy of the weights in dynamic routing are mostly low. In some embodiments, the intuition of CapsNN is used to achieve the goal of dataset distillation. Dataset distillation aims to generate a distilled dataset Z from an original dataset X, where the mutual information between X and Z is maximized. The mutual information can be represented as:

$$I(X, Z) = \int \int p(z \mid x)\hat{p}(x)\log\frac{p(z \mid x)}{p(z)}dxdz$$

where $\hat{p}(x)$ is the distribution of the original dataset X, and $p(z)=\int p(z|x)\hat{p}(x)dx$. A good distilled image $z \in Z$ should follow $p(z|x)=\max_{p(Z|X)}I(X, Z)$. Fortunately, this is also the goal of all feature encoders. CapsNN, however, has the property of hierarchical characteristics while convolutional networks need additional components to achieve the same operation. Therefore, some embodiments utilize a CapsNN approach. Additionally, to enable the distilled dataset to contain more information, a loss is added to make the capsules orthogonal:

$$L_{or} = \sum_{i,j \in Z} \langle i, j \rangle$$

Here, $\langle i,j \rangle$ represent the cosine similarity between two prototypes. Finally, the overall loss to be minimized can be represented as:

$$\mathbb{L} = L_{or}(Z) - I(X,Z)$$

Figure 4:
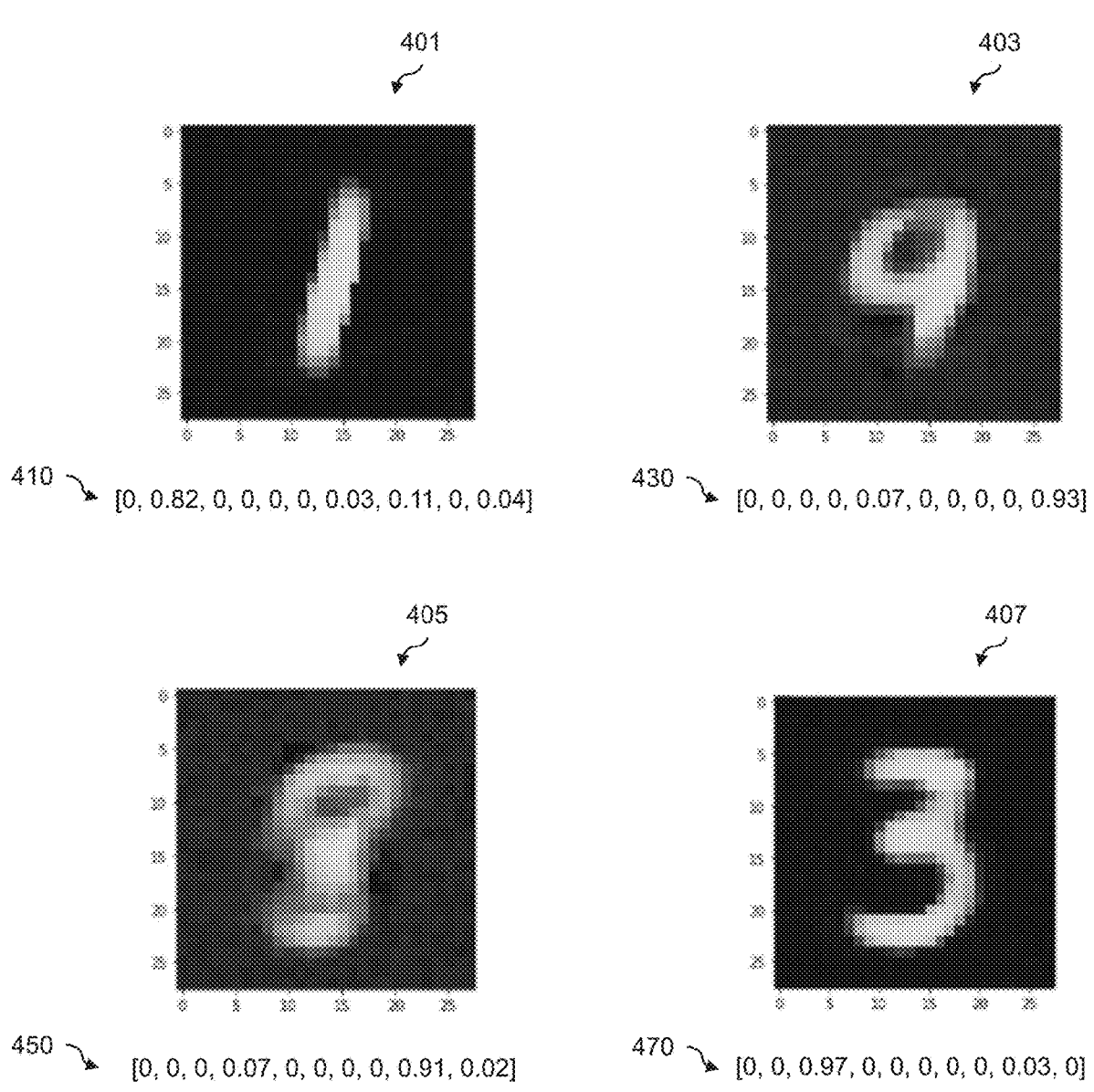
FIG. 4 shows capsules and associated soft labels produced using a machine learning model in an illustrative embodiment.

Based on the above definitions, a CapsNN is first trained using a traditional classification task on a training dataset. Then, capsules inside the trained network are extracted as shown in FIG. 4. FIG. 4 shows a set of capsules 401, 403, 405 and 407 for the digits 1, 9, 8 and 3, respectively. FIG. 4 also shows sets of soft labels 410, 430, 450 and 470 for the capsules 401, 403, 405 and 407. The soft labels include ten values, representing the probability that a particular one of the capsules represents each of the ten numbers from 0-9. The capsules extracted from the CapsNN are visualized as shown in FIG. 4, and are meaningful and contain almost all of the information in the original dataset because of the orthogonality of the capsules. Therefore, these capsules may be viewed as distilled data. To be the distilled dataset, the capsules need labels for downstream tasks. In some embodiments, PBoI is used for soft label generation.

Figure 5:
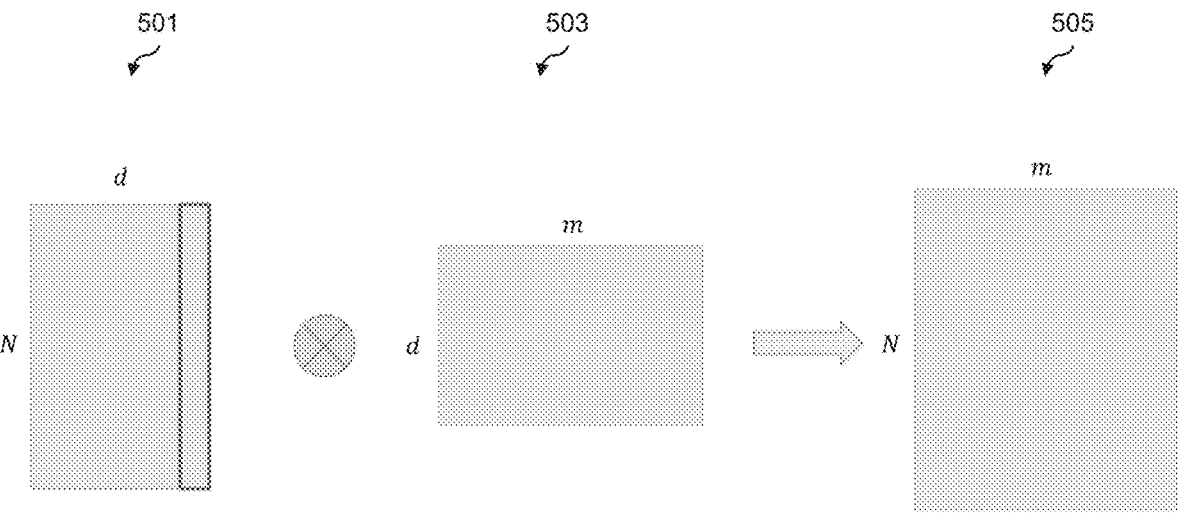
FIG. 5 shows generation of representations of capsules produced using a machine learning model in an illustrative embodiment.

As described above, prototypes may be derived from a trained capsule neural network. Because such prototypes are patterns of the original dataset, which corresponds to topics in a topic model, the topic distribution for each image may be found and used to generate PBoI for each prototype. This process is illustrated in FIG. 5, where it is assumed that there are N samples and d capsules. An N*d matrix represents the relation between images and capsules, like topic distribution in a topic model. After training, a d*m matrix 503 is obtained, where m represents the dimension of each capsule. Each column in the N*d matrix 501 becomes the PBoI of each capsule, where the value inside the PBoI represents the similarity between an image and that capsule. Finally, all of the N samples have their own labels, which can get used to generate soft labels by a weighted summation inside the PBoI. As illustrated in FIG. 5, N samples with d capsules can generate an N*1 PBoI representation for one prototype, while each capsule has d dimensions. After multiplying the N*d matrix 501 and the d*m matrix 503, an N*m feature representation 505 of the original image is obtained. Referring back to FIG. 4 and capsule 401, it is found that most of the samples inside its PBoI are 1, so its soft label is [0, 0.82, 0, 0, 0, 0, 0.03, 0.11, 0, 0.04]. Because the number 1 could also be a component of the numbers 6, 7 and 9, some probability is assigned to these numbers but the highest probability (e.g., 0.82) is assigned to 1. The PBoI is found for each capsule, which if normalized can be used to choose samples with high similarities to be its ancestors.

Conventional adversarial example defense algorithms are vulnerable to various attacks. The technical solutions described herein provide an adversarial example defense that is advantageously generalized through the use of soft labels and dataset distillation. Thus, the technical solutions described herein in some embodiments focus on: how to make an adversarial example defense more generalized; how to make adversarial example identification more accurate; and how to better update a machine learning model to enable it to better handle adversarial example attacks.

The DDAD algorithm used in some embodiments includes a number of processing blocks or stages, including: a training processing block or stage; a coarse filtering processing block or stage; an abnormal data sample identification processing block or stage; a relabeling processing block or stage; and a noise-aware model retraining processing block or stage. In the training stage, two machine learning models are trained for utilization in subsequent stages. In the coarse filtering stage, the two trained machine learning models are used to coarsely find potential or suspected adversarial examples. Adversarial examples are identified in the abnormal data sample identification (searching) stage. In the relabeling stage, data samples identified as adversarial examples are re-checked to confirm that they are actual adversarial examples and relabeled. The relabeling stage may involve human or manual checking. The noise-ware model retraining stage utilizes confidence information from previous stages to retrain the machine learning models.

Figure 6A:
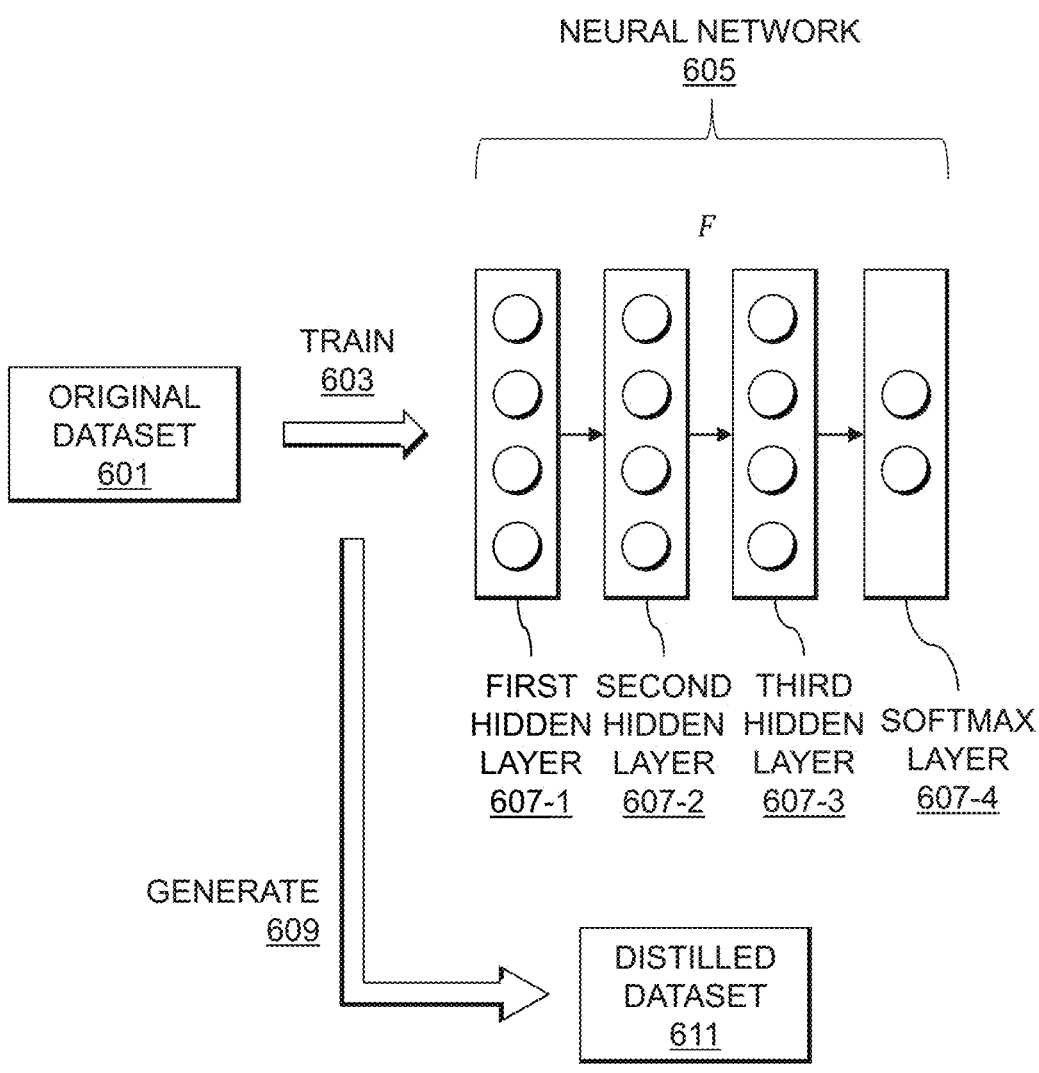
FIGS. 6A and 6B show training of first and second machine learning models using an original dataset and a distilled dataset in an illustrative embodiment.
Figure 6B:
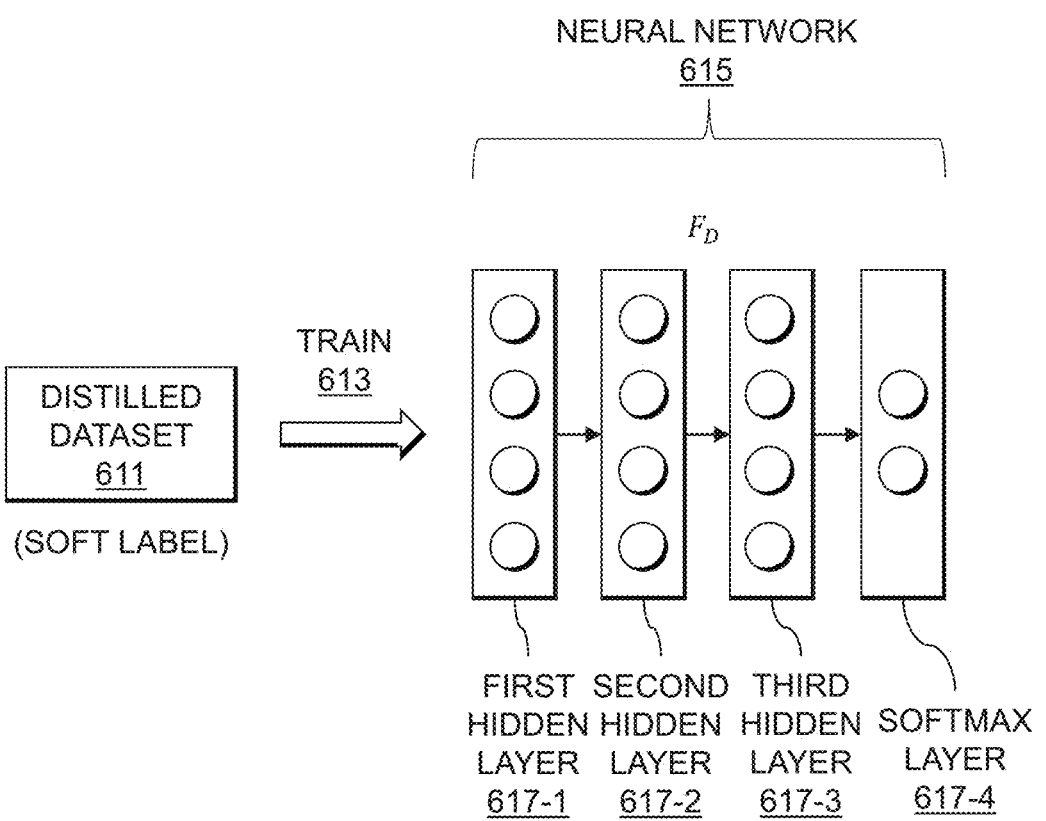

As described above, the DDAD algorithm may begin with a training stage where two machine learning models are trained. For dual training, the intuition is that knowledge extracted by distillation (e.g., in the form of probability vectors or soft labels) can be transferred to smaller networks to maintain accuracies comparable with those of larger networks. Thus, the distilled knowledge can be beneficial to improve generalization capabilities of DNNs and other machine learning models outside of their training datasets, and therefore enhances the machine learning models' resilience to perturbations (e.g., adversarial examples). In the description below, for ease of illustration, it is assumed that the machine learning models are DNNs used for classification tasks, with the DNNs being designed with a softmax layer as their output layer. This is illustrated in FIG. 6A, which shows an original dataset 601 being used to train 603 a neural network 605 (e.g., a DNN) that includes hidden layers 607-1, 607-2 and 607-3, and a softmax output layer 607-4. The original dataset 601 is also used to generate 609 a distilled dataset 611. FIG. 6B shows how the distilled dataset 611 (e.g., including soft labels) is used to train 613 another neural network 615 (e.g., a DNN) which similarly includes hidden layers 617-1, 617-2 and 617-3, and a softmax output layer 617-4. It should be appreciated that the architectures of the neural networks 605 and 615 shown in FIGS. 6A and 6B are presented by way of example only, and that other DNN architectures or more generally other machine learning models may be used. The neural network 605 is also referred to as a model F, while the neural network 615 is also referred to as a model $F_D$.

The input of the model initialization training stage is a set of $\mathcal{X}$ samples with associated class labels. Specifically, let $X \in \mathcal{X}$ be a sample, and let Y(X) denote that sample's discrete label (also referred to as a hard label). Y(X) is an indicator vector, such that the only non-zero element corresponds to the correct class index (e.g., $(0, 0, 1, 0, \ldots, 0)$ indicates that the sample is in the class with the third index). Given this training set $\{(X, Y(X)):X \in \mathcal{X}\}$, a DNN F is trained with a probabilistic output layer of CapsNN. F(X) is a probability vector (e.g., soft labels) over the class of all possible labels. More precisely, if the model F has parameters $\theta_F$, then its output on X is a probability distribution $F(X)=p(\cdot|X, \theta_F)$, where for any label Y in the label class, $p(Y|X, \theta_F)$ gives a probability that the label is Y. To simplify notation later, $F_i(X)$ is used to denote the probability of input X to be in class $i \in 0 \ldots N-1$ according to model F with parameters $\theta_F$. A new training set is formed by considering samples of the form (X, F(X)) for $X \in \mathcal{D}$, were $\mathcal{D}$ is the distilled dataset derived using the dataset distillation algorithm described above. That is, instead of using hard class label Y(X) for X, a soft-target F(X) encoding F's belief probabilities over the label class is used. Using the new training set $\{(X, F(X)):X \in \mathcal{X}\}$, the model $F_D$ is trained. Here, F and $F_D$ have the same neural network architecture, and the temperature of the softmax output layer remains T. The model $F_D$ is also referred to as the distilled model.

Advantageously, training a network with this explicit relative information about classes prevents the models from fitting too tightly to the data, and contributes to a better generalization around training points.

Figure 7:
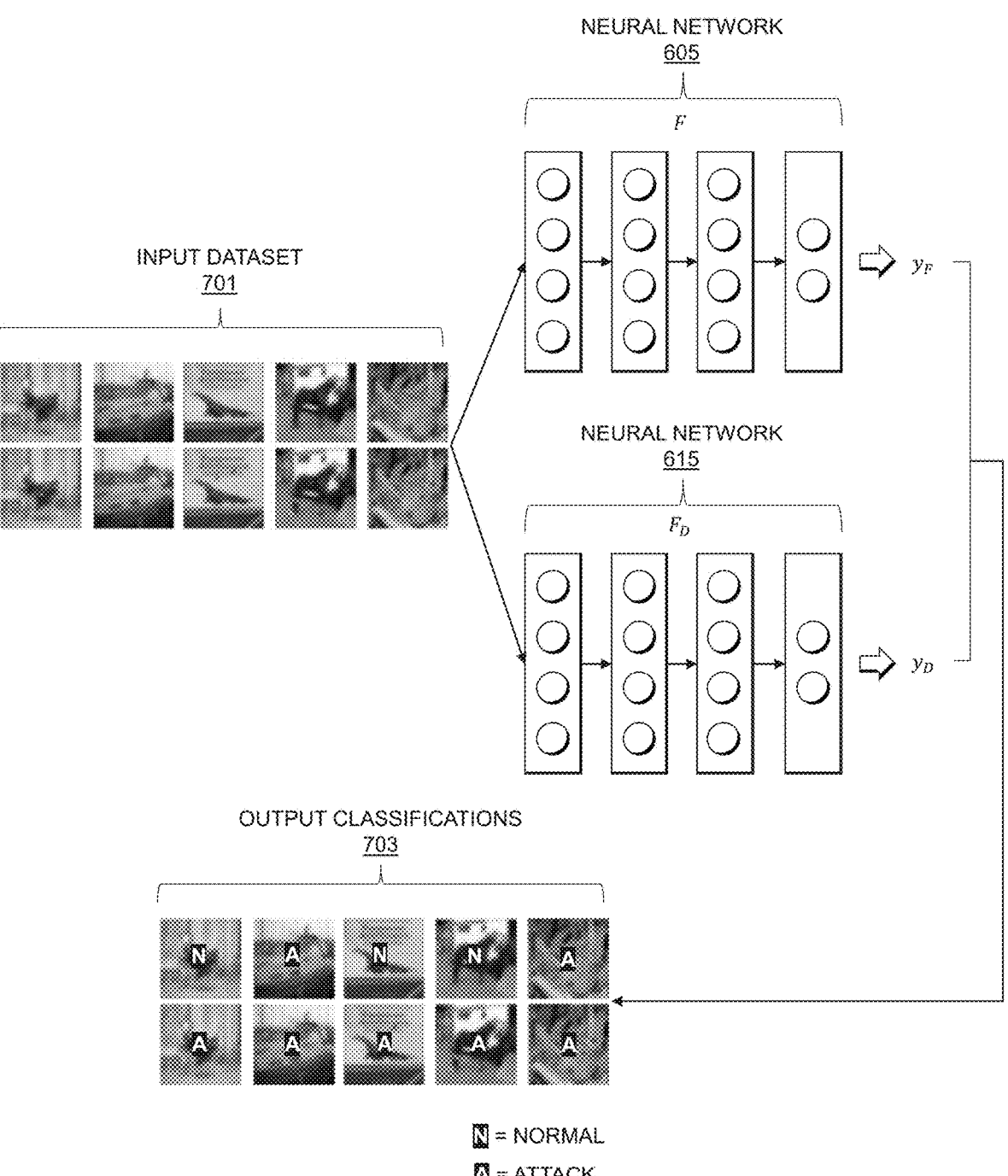
FIG. 7 shows coarse filtering of an input dataset using first and second trained machine learning models in an illustrative embodiment.

After model initialization, adversarial sample identification is performed. FIG. 7 illustrates the coarse filtering stage, where some adversarial attack samples are coarsely identified in an input dataset 701 by comparing the outputs $y_F$ and $y_D$ of the models F and $F_D$, shown as output classifications 703. The input dataset 701 includes new samples, where some of the samples have incorrect labels and are carefully designed by attackers. To begin, the predicted labels Y(X) and $Y_D(X)$ are compared. If they are not the same, a sample is identified as abnormal (e.g., a potential or suspected adversarial example) in the coarse filtering stage. Such identified abnormal samples are candidates for searching in the abnormal data sample identification stage. Before the abnormal sample identification stage, a first confidence score is calculated according to:

$$w_{coarse} = sim(F(X), F_D(X)), \text{ if } Y(X) \neq Y_D(X) \qquad 5$$

where sim(*,*) represents a similarity metric. In some embodiments, cosine similarity is used for the similarity metric. FIG. 7 visualizes one example of coarse filtering results. For the input dataset 701, each column includes one original image (the upper images) and one adversarial example (the lower images). As shown in the output classifications, almost all of the adversarial examples are detected as attacks in the results, but some of the original images are also identified as attacks (e.g., due to model errors). Therefore, a fine-tuning step is used to find true positive samples.

Figure 8:
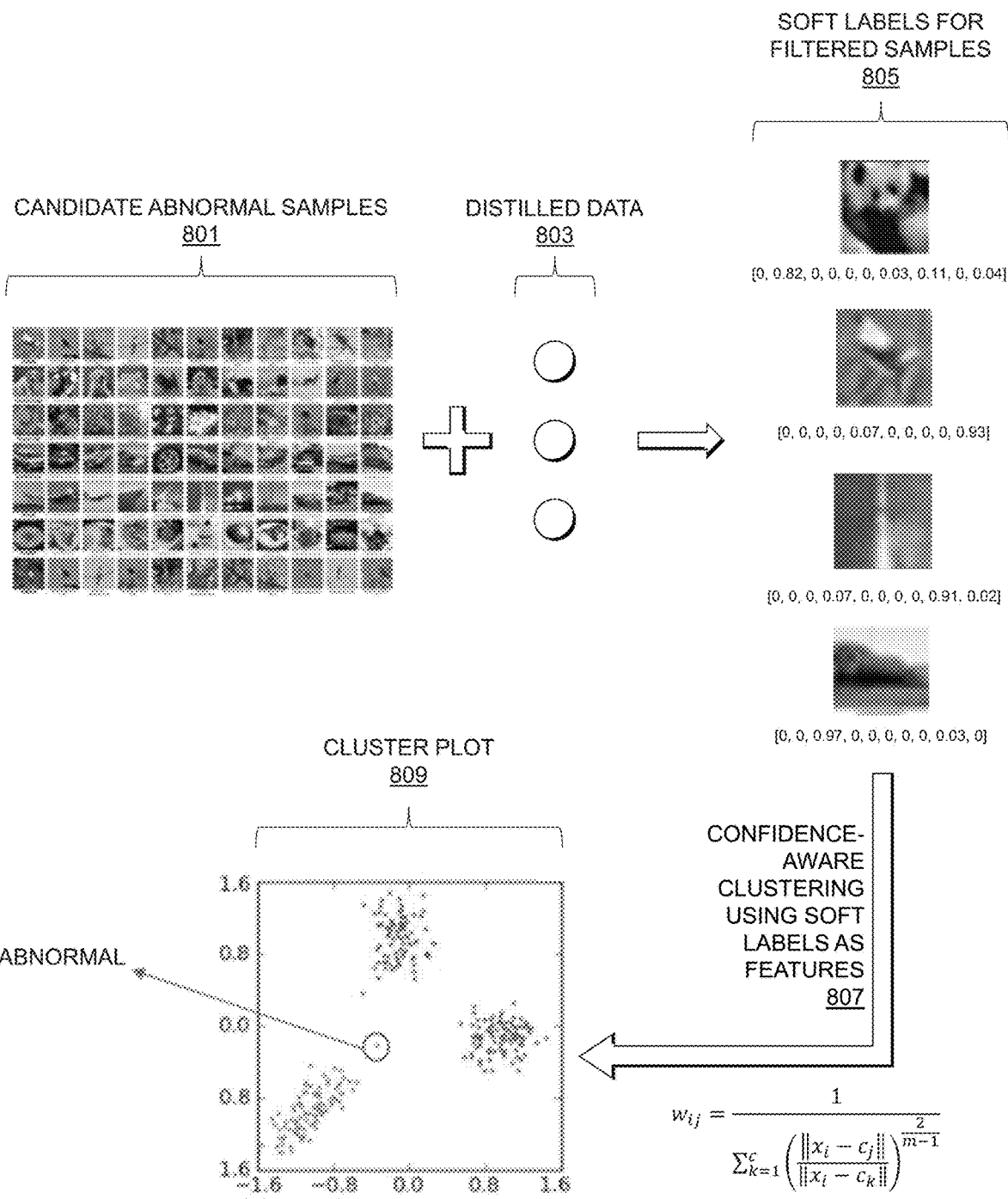
FIG. 8 shows confidence-aware clustering of candidate abnormal samples utilizing soft labels as features in an illustrative embodiment.

Such fine-tuning is performed in the abnormal data sample identification or searching stage where more accurate filtering is performed. FIG. 8 illustrates the abnormal data sample identification stage, which beings with candidate abnormal samples 801 (e.g., which are found during the coarse filtering stage). The candidate abnormal samples 801 and distilled data 803 are used to generate soft labels 805 for the filtered samples. Confidence-aware clustering 807 is then performed, using the soft labels 805 as features. This results in a cluster plot 809, where abnormal samples (e.g., those not belonging to any cluster) are identified.

The soft labels 805 for each of the candidate abnormal samples 801, $x_i$, are calculated according to:

$$Y_{soft,i} = \sum_{p \in P} w_{i,p} \times L_{soft,p}$$

where $L_{soft,i}$ is the soft label of sample i, and P is the set of prototypes (e.g., distilled data 803). After getting the soft labels 805, these probabilistic representations contain generalized information, and then weighted K-means clustering may be performed. For candidate sample $x_i$, the likelihood that the data point belongs to cluster j can be calculated using the following equation for the weight:

$$w_{ij} = \frac{1}{\sum_{k=1}^{c} \left( \frac{\|x_i - c_j\|}{\|x_i - c_k\|} \right)^{\frac{2}{m-1}}}$$

Here, $c_j$ are coordinates of the center of the jth cluster. The value of m is a parameter that controls the fuzziness of the algorithm. In some embodiments, m is set to a default value of 2. For each data point, the sum of the weights is 1, which is why they work well as likelihoods or probabilities. If $\max_{j \in C} w_{i,j} \leq 0$, where C are the clusters and $\theta$ is the threshold, then it is assumed that $x_i$ is an attack sample. The value of $\theta$ in some embodiments is set as 0.7. The filtered samples are then processed in the relabeling stage. In the relabeling stage, a manual double-check is performed and the samples are relabeled as appropriate.

Figure 9A:
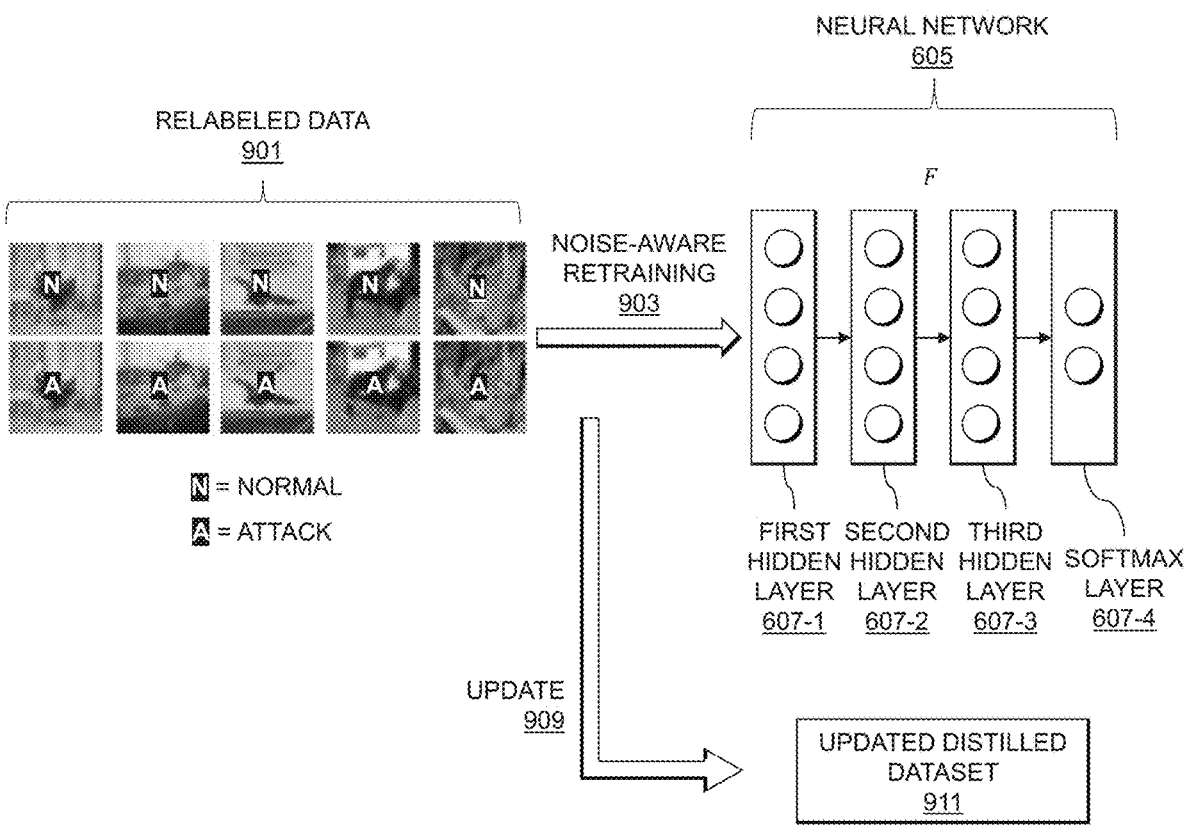
FIGS. 9A and 9B show retraining of first and second machine learning models using an updated dataset and an updated distilled dataset in an illustrative embodiment.
Figure 9B:
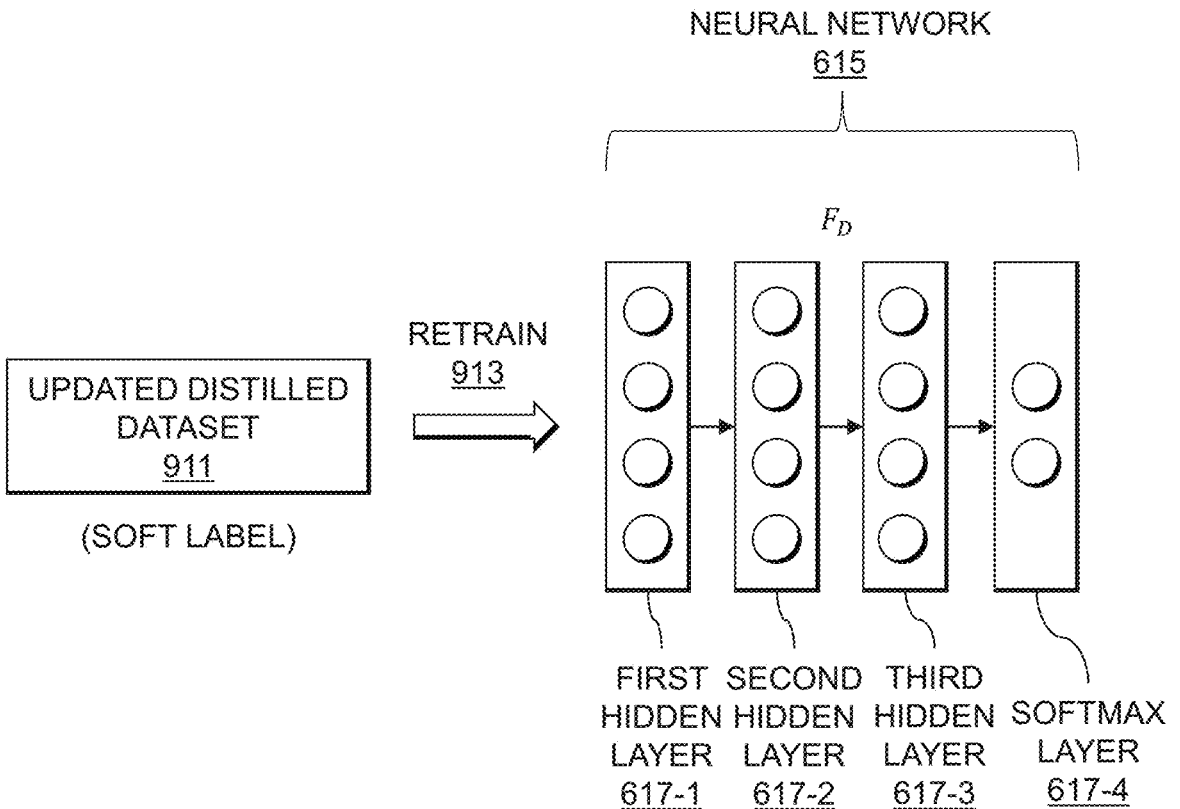

In the noise-aware model retraining stage, the relabeled data is sent back to the models F and $F_D$ for retraining as illustrated in FIGS. 9A and 9B. FIG. 9A shows the retraining of model F, where relabeled data 901 is used for noise-aware retraining 903 and for generating an update 909 of the distilled dataset 911. FIG. 9B shows the retraining of model $F_D$, where the updated distilled dataset 911 is used for retraining 913. Here, the confidence score of each attack sample is calculated according to:

$$\hat{C} = \lambda w_{coarse} + (1 - \lambda) \max_{j \in C} w_{i,j}$$

Then, during the retraining 903 and 913, the loss for the attack samples is:

$$\mathcal{L} = \frac{L}{\hat{C}}$$

where L is the original classification loss.

The DDAD algorithm described herein was analyzed against two public datasets—the Modified National Institute of Standards and Technology (MNIST) database and the Canadian Institute For Advanced Research (CIFAR) 10 dataset. The MNIST adversarial sample success rate percentage using the DDAD algorithm was 1.44%, as compared with 95.89% where no adversarial example defense algorithm was applied. The CIFAR 10 adversarial sample success rate percentage using the DDAD algorithm was 6.11%, as compared with 87.89% where no adversarial example defense algorithm was applied.

Knowledge distillation has been adapted for robustness in techniques referred to as defensive distillation. In such an approach, "teacher" and "student" machine learning models have identical architectures. An initial teacher network or machine learning model is trained on class labels, and then distilled at temperature t onto a student network or machine learning model of identical architecture. Defensive distillation improves robustness to a certain $\ell_0$ attack. Defensive distillation, however, gains robustness due to gradient masking, and this defense has been broken using $\ell_0$, $\ell_\infty$ and $\ell_2$ attacks. Further, defensive distillation is computationally expensive and it is unnecessary to train a new model with the same architecture.

The robustness brought by defensive distillation is mainly brought by the abundant information in soft labels. The technical solutions described herein thus extend a dataset distillation algorithm using soft labels, which can bring the model more generalized estimated distribution than defensive distillation while the training cost (e.g., for the $F_D$ model) is minimized as there is less data and a smaller model. This advantageously enables the possibility of edge computing approaches. A simple aggregation mechanism is used in some embodiments to further solve problems which cannot be solved by defensive distillation. The technical solutions described herein also utilize confidence-aware clustering to make the results more robust and accurate using features of the soft labels for candidate samples. Noise-aware model retraining can also leverage manual effort or double-checking of potential or suspected adversarial samples. Thus, the DDAD algorithm in some embodiments leverages dataset distillation, aggregation mechanisms, clustering (e.g., K-means clustering) and model retraining processes.

The DDAD algorithm may be used to perform adversarial example defense though detection of adversarial examples and intelligent retraining of machine learning models. Such an approach may be used to provide high quality data management services and data security for machine learning applications.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for defense against adversarial example input to machine learning models will now be described in greater detail with reference to FIGS. 10 and 11. Although described in the context of system 100, these platforms may also be used to implement at least portions of other information processing systems in other embodiments.

Figure 10:
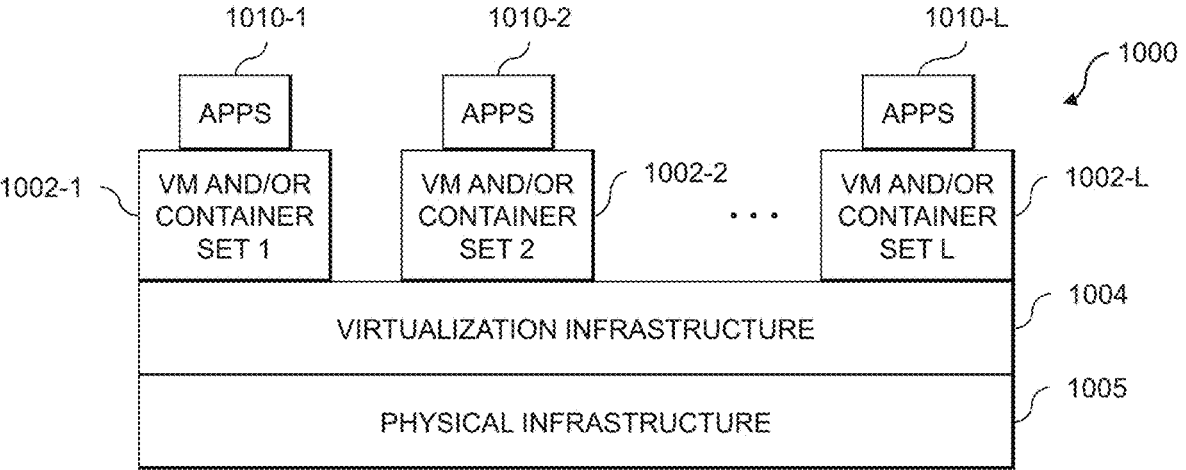
FIGS. 10 and 11 show examples of processing platforms that may be utilized to implement at least a portion of an information processing system in illustrative embodiments.
Figure 11:
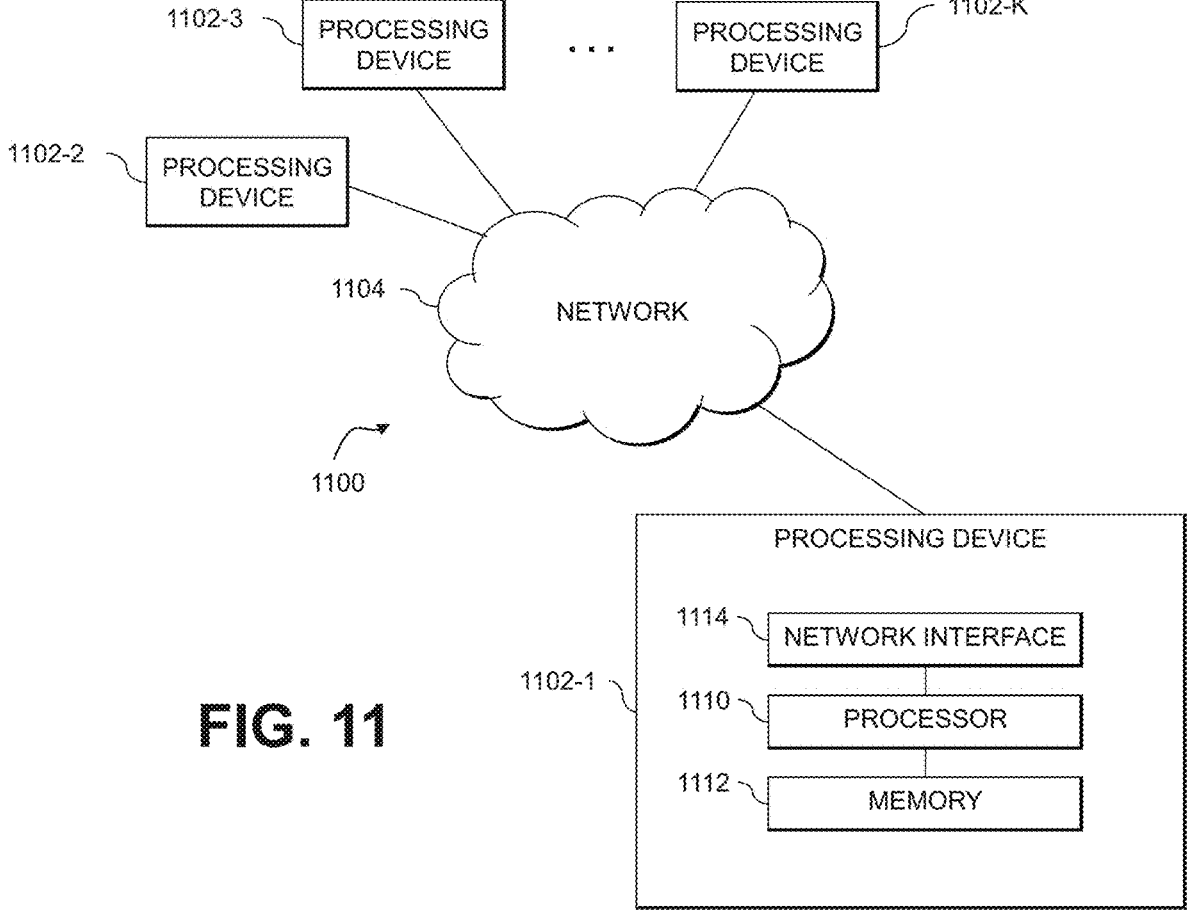

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for defense against adversarial example input to machine learning models as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, machine learning models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured to perform steps of:

training a first machine learning model utilizing a first training dataset and training a second machine learning model utilizing a second training dataset, the first training dataset comprising a plurality of inputs each associated with a class label of one of a set of two or more classes, the second training dataset comprising distilled representations of each of at least a subset of the classes in the set of two or more classes, wherein the first machine learning model and the second machine learning model utilize a same neural network architecture, the neural network architecture comprising one or more hidden layers and an output layer;

identifying a plurality of candidate adversarial example inputs utilizing the trained first and second machine learning models, wherein identifying a given one of the plurality of candidate adversarial example inputs utilizing the trained first and second machine learning models is based at least in part on a similarity of a first output classification for the given candidate adversarial example input generated utilizing the trained first machine learning model and a second output classification for the given candidate adversarial example input generated utilizing the trained second machine learning model;

determining whether respective ones of the plurality of candidate adversarial example inputs are true positive adversarial example inputs based at least in part on a confidence-aware clustering of the plurality of candidate adversarial example inputs, the confidence-aware clustering being based at least in part on (i) generating, using processor-based adversarial example identification logic, soft label information for the plurality of candidate adversarial example inputs, (ii) generating two or more clusters of the plurality of candidate adversarial example inputs utilizing the soft label information generated for the plurality of candidate adversarial example inputs as features, and (iii) identifying true positive ones of the one or more candidate adversarial example inputs based at least in part on a weighted clustering algorithm that determines distances between ones of the plurality of candidate adversarial example inputs and centers of each of the generated two or more clusters of the plurality of candidate adversarial example inputs;

generating updated first and second training datasets, the updated first training dataset comprising corrected class labels for ones of the plurality of candidate adversarial example inputs determined to be true positive adversarial example inputs, the updated second training dataset comprising updated distilled representations determined utilizing the corrected class labels for the ones of the plurality of candidate adversarial example inputs determined to be true positive adversarial example inputs; and re-training the first machine learning model utilizing the updated first training dataset and re-training the second machine learning model utilizing the updated second training dataset.

2. The apparatus of claim 1 wherein the class labels in the first training dataset comprise hard label information, and wherein the distilled representations in the second training dataset comprise the soft label information.

3. The apparatus of claim 1 wherein the distilled representations in the second training dataset comprise prototypes of feature information for each of at least the subset of the classes in the set of two or more classes.

4. The apparatus of claim 1 wherein the first machine learning model comprises a capsule neural network, and wherein the distilled representations in the second training dataset are derived from patterns in the first training dataset learned by the trained capsule neural network.

5. The apparatus of claim 1 wherein identifying the given candidate adversarial example input comprises determining whether a first output classification for the given candidate adversarial example input generated utilizing the trained first machine learning model is different than a second output classification for the given candidate adversarial example input generated utilizing the trained second machine learning model.

6. The apparatus of claim 1 wherein the confidence-aware clustering of the plurality of candidate adversarial example inputs is based on confidence scores for the plurality of candidate adversarial example inputs, a given confidence score for the given candidate adversarial example input being determined based at least in part on a similarity metric characterizing the similarity of first and second output classifications for the given candidate adversarial example input generated by the trained first and second machine learning models.

7. The apparatus of claim 6 wherein the similarity metric comprises a cosine similarity metric.

8. The apparatus of claim 1 wherein the confidence-aware clustering utilizes a K-means clustering algorithm.

9. The apparatus of claim 1 wherein the confidence-aware clustering comprises, for the given candidate adversarial example input, determining probabilities that the given candidate adversarial example input belongs to each class in the set of two or more classes.

10. The apparatus of claim 1 wherein re-training the first and second machine learning models is based at least in part on confidence scores for the ones of the plurality of candidate adversarial example inputs determined to be true positive adversarial example inputs.

11. The apparatus of claim 10 wherein the re-training of the first and second machine learning models has a loss determined based at least in part on ratios of the confidence scores for the ones of the plurality of candidate adversarial example inputs determined to be true positive adversarial example inputs and an original classification loss during the training of the first and second machine learning models.

12. The apparatus of claim 1 wherein the at least one processing device is further configured to utilize at least one of the re-trained first and second machine learning models for performing classification of subsequent input.

13. A computer program product comprising a non-transitory processor-readable storage medium having stored therein program code of one or more software programs, wherein the program code when executed by at least one processing device causes the at least one processing device to perform steps of:

training a first machine learning model utilizing a first training dataset and training a second machine learning model utilizing a second training dataset, the first training dataset comprising a plurality of inputs each associated with a class label of one of a set of two or more classes, the second training dataset comprising distilled representations of each of at least a subset of the classes in the set of two or more classes, wherein the first machine learning model and the second machine learning model utilize a same neural network architecture, the neural network architecture comprising one or more hidden layers and an output layer;

identifying a plurality of candidate adversarial example inputs utilizing the trained first and second machine learning models, wherein identifying a given one of the plurality of candidate adversarial example inputs utilizing the trained first and second machine learning models is based at least in part on a similarity of a first output classification for the given candidate adversarial example input generated utilizing the trained first machine learning model and a second output classification for the given candidate adversarial example input generated utilizing the trained second machine learning model;

determining whether respective ones of the plurality of candidate adversarial example inputs are true positive adversarial example inputs based at least in part on a confidence-aware clustering of the plurality of candidate adversarial example inputs, the confidence-aware clustering being based at least in part on (i) generating, using processor-based adversarial example identification logic, soft label information for the plurality of candidate adversarial example inputs, (ii) generating two or more clusters of the plurality of candidate adversarial example inputs utilizing the soft label information generated for the plurality of candidate adversarial example inputs as features, and (iii) identifying true positive ones of the one or more candidate adversarial example inputs based at least in part on a weighted clustering algorithm that determines distances between ones of the plurality of candidate adversarial example inputs and centers of each of the generated two or more clusters of the plurality of candidate adversarial example inputs;

generating updated first and second training datasets, the updated first training dataset comprising corrected class labels for ones of the plurality of candidate adversarial example inputs determined to be true positive adversarial example inputs, the updated second training dataset comprising updated distilled representations determined utilizing the corrected class labels for the ones of the plurality of candidate adversarial example inputs determined to be true positive adversarial example inputs; and re-training the first machine learning model utilizing the updated first training dataset and re-training the second machine learning model utilizing the updated second training dataset.

14. The computer program product of claim 13 wherein identifying the given candidate adversarial example input comprises determining whether a first output classification for the given candidate adversarial example input generated utilizing the trained first machine learning model is different than a second output classification for the given candidate adversarial example input generated utilizing the trained second machine learning model.

15. The computer program product of claim 13 wherein the confidence-aware clustering of the plurality of candidate adversarial example inputs is based on confidence scores for the plurality of candidate adversarial example inputs, a given confidence score for the given candidate adversarial example input being determined based at least in part on a similarity metric characterizing the similarity of first and second output classifications for the given candidate adversarial example input generated by the trained first and second machine learning models.

16. A method comprising:

training a first machine learning model utilizing a first training dataset and training a second machine learning model utilizing a second training dataset, the first training dataset comprising a plurality of inputs each associated with a class label of one of a set of two or more classes, the second training dataset comprising distilled representations of each of at least a subset of the classes in the set of two or more classes, wherein the first machine learning model and the second machine learning model utilize a same neural network architecture, the neural network architecture comprising one or more hidden layers and an output layer;

identifying a plurality of candidate adversarial example inputs utilizing the trained first and second machine learning models, wherein identifying a given one of the plurality of candidate adversarial example inputs utilizing the trained first and second machine learning models is based at least in part on a similarity of a first output classification for the given candidate adversarial example input generated utilizing the trained first machine learning model and a second output classification for the given candidate adversarial example input generated utilizing the trained second machine learning model;

determining whether respective ones of the plurality of candidate adversarial example inputs are true positive adversarial example inputs based at least in part on a confidence-aware clustering of the plurality of candidate adversarial example inputs, the confidence-aware clustering being based at least in part on (i) generating, using processor-based adversarial example identification logic, soft label information for the plurality of candidate adversarial example inputs, (ii) generating two or more clusters of the plurality of candidate adversarial example inputs utilizing the soft label information generated for the plurality of candidate adversarial example inputs as features, and (iii) identifying true positive ones of the one or more candidate adversarial example inputs based at least in part on a weighted clustering algorithm that determines distances between ones of the plurality of candidate adversarial example inputs and centers of each of the generated two or more clusters of the plurality of candidate adversarial example inputs;

generating updated first and second training datasets, the updated first training dataset comprising corrected class labels for ones of the plurality of candidate adversarial example inputs determined to be true positive adversarial example inputs, the updated second training dataset comprising updated distilled representations determined utilizing the corrected class labels for the ones of the plurality of candidate adversarial example inputs determined to be true positive adversarial example inputs; and re-training the first machine learning model utilizing the updated first training dataset and re-training the second machine learning model utilizing the updated second training dataset;

wherein the method is performed by at least one processing device comprising a processor coupled to a memory.

17. The method of claim 16 wherein identifying the given candidate adversarial example input comprises determining whether a first output classification for the given candidate adversarial example input generated utilizing the trained first machine learning model is different than a second output classification for the given candidate adversarial example input generated utilizing the trained second machine learning model.

18. The method of claim 16 wherein the confidence-aware clustering of the one or more candidate adversarial example inputs is based on confidence scores for the plurality of candidate adversarial example inputs, a given confidence score for a given one of the plurality of candidate adversarial example inputs being determined based at least in part on a similarity metric characterizing similarity of first and second output classifications for the given candidate adversarial example input generated by the trained first and second machine learning models.

19. The method of claim 16 wherein the class labels in the first training dataset comprise hard label information, and wherein the distilled representations in the second training dataset comprise the soft label information.

20. The method of claim 16 wherein the distilled representations in the second training dataset comprise prototypes of feature information for each of at least the subset of the classes in the set of two or more classes.

\* \* \* \* \*